(12) United States Patent
Singer et al.

(10) Patent No.: US 10,278,402 B2
(45) Date of Patent: May 7, 2019

(54) APPARATUS FOR TRANSPORTING ELONGATE SAUSAGES WHICH HAVE A CURVATURE

(71) Applicant: Singer & Sohn GmbH, Berching (DE)

(72) Inventors: Manfred Singer, Berching (DE); Dieter Koller, Muhlhausen (DE)

(73) Assignee: SINGER & SOHN GMBH, Berching (DE)

( * ) Notice: Subject to any disclaimer, the term of this patent is extended or adjusted under 35 U.S.C. 154(b) by 0 days.

(21) Appl. No.: 16/155,396

(22) Filed: Oct. 9, 2018

(65) Prior Publication Data
US 2019/0104746 A1    Apr. 11, 2019

(30) Foreign Application Priority Data
Oct. 10, 2017 (DE) .......................... 10 2017 123 517

(51) Int. Cl.
*A22C 11/00* (2006.01)
*B65B 35/58* (2006.01)
*B65B 25/06* (2006.01)

(52) U.S. Cl.
CPC ............ *A22C 11/008* (2013.01); *B65B 35/58* (2013.01); *B65B 25/065* (2013.01)

(58) Field of Classification Search
CPC ........ A22C 11/00; A22C 11/008; A22C 11/02
USPC ....... 452/30–32, 35–37, 46–48, 51; 198/406, 198/407, 412, 413, 606, 817
See application file for complete search history.

(56) References Cited

U.S. PATENT DOCUMENTS

| 4,082,177 | A |   | 4/1978 | Aidlin et al. |
| 5,306,204 | A | * | 4/1994 | Smith .................. A22C 15/007 452/186 |
| 7,166,020 | B2 | * | 1/2007 | Van De Wal .......... A22C 15/00 452/32 |
| 7,641,543 | B2 | * | 1/2010 | Stimpfl ................ A22C 11/006 452/31 |

(Continued)

FOREIGN PATENT DOCUMENTS

| DE | 102016114731 B3 | 9/2017 |
| DE | 202017104924 U1 | 9/2017 |
| GB | 2161445 A | 1/1986 |

OTHER PUBLICATIONS

European Search Report, EP18185369, dated Feb. 4, 2019.

*Primary Examiner* — Richard T Price, Jr.
(74) *Attorney, Agent, or Firm* — Lucas & Mercanti, LLP

(57) ABSTRACT

A device for the transportation of elongate sausages exhibiting a curvature, the device having a first conveying device including two circulating conveyor belts or belt conveyors spaced apart from one another laterally, each having studs for randomly receiving the sausages. An end portion of a sausage can be received in two adjacent studs in each case. A free space is provided beneath the conveying belts or belt conveyors at least sectionally along the conveying path, in order to facilitate a swing-through of the sausages mounted on the conveyor belts or belt conveyors in the peripheral region so that they hang in the free space with the curvature facing downwards, said device has a lead component into which a sagging sausage runs, by which it is pivoted up in the direction of the conveying plane, and having a second conveying device for receiving the upwardly pivoted sausage.

21 Claims, 6 Drawing Sheets

(56) References Cited

U.S. PATENT DOCUMENTS

| | | | |
|---|---|---|---|
| 8,911,284 B2 * | 12/2014 | Waldstadt | A22C 11/00 452/51 |
| 8,979,619 B2 * | 3/2015 | Lang | A22C 11/00 452/32 |
| 2018/0042248 A1 | 2/2018 | Knodel et al. | |

* cited by examiner

APPARATUS FOR TRANSPORTING ELONGATE SAUSAGES WHICH HAVE A CURVATURE

CROSS-REFERENCE TO RELATED APPLICATIONS

The present application claims priority of DE 10 2017 123 517.5, flied Oct. 10, 2017, the priority of this application is hereby claimed and this application is incorporated herein by reference.

BACKGROUND OF THE INVENTION

The invention relates to a device for transporting elongate sausages exhibiting a curvature.

As is commonly known, sausages are produced in different calibers and, depending on the kind of sausage, they have either a straight, elongate form or, as in most cases, they are curved, in other words they exhibit a bend. The finished sausages are transported one after the other lying on a conveying device following appropriate treatment where necessary. In this case the sausages are arranged on the conveying device with their longitudinal direction transverse to the conveying direction. They are usually transported to a corresponding grouping device in which corresponding groups of sausages are then created from the individual sausages, after which the individual groups of sausages are gripped via a corresponding handling system and inserted in corresponding packaging.

While the grouping and insertion does not constitute a problem in the case of straight, elongate sausages, as the straight sausages within the group of sausages rest directly against one another and, as a consequence, each group of sausages is always virtually the same size, problems occur in this respect when it comes to curved, in other words bent, sausages. This is because the sausages are conveyed at random along via the conveying device. This means that two transported sausages arranged behind one another may either be identically aligned, in other words they may lie with their curvature uniformly or else identically aligned, or they are differently positioned, in other words either the two curvatures or curvature convexities lie adjacent to one another or the two ends each lie adjacent to one another and the curvatures or convexities face away from one another. If within the grouping device corresponding groups of sausages are formed from these more or less randomly aligned sausages, the length of the group of sausages, viewed in the conveying direction, varies depending on how the individual sausages lie in relation to one another. Ideally, if all curvatures or convexities are identically aligned, the individual sausages will lie as closely as possibly against one another. In the worst case, two adjacent sausages are each spaced as far apart from one another as possible, in other words either the convexities lie against one another or the respective ends, so that consequently a very long batch of groups of sausages results. Automated handling is virtually impracticable in this case.

In order to solve this particular problem, sometimes also at the specific request of the plant operator, it is known in the art for the alignment of the sausages being transported one after the other to be detected by means of a detection device and using a mechanical alignment or adjustment mechanism which has a kind of grab, in order to detect a sausage not aligned in a previously defined direction, to lift and turn it so that in this way all the sausages being transported to the grouping device are identically aligned. Integrating an alignment or adjustment mechanism of this kind is very expensive, however, and the alignment or turning process also takes a substantial amount of time, so that the throughput is not particularly great as a result of a constantly changing number of turning or reversing operations.

SUMMARY OF THE INVENTION

The problem addressed by the invention is therefore that of specifying a device that is improved in this respect for transporting elongate sausages exhibiting a curvature.

In order to solve this problem, a device is provided according to the invention for the transportation of elongate sausages exhibiting a curvature, said device having a first conveying device comprising two circulating conveyor belts or belt conveyors spaced apart from one another laterally, each having studs for randomly receiving the sausages, wherein an end portion of a sausage can be received in two adjacent studs in each case, wherein a free space is provided beneath the conveying belts or belt conveyors at least sectionally along the conveying path, in order to facilitate a swing-through of the sausages mounted on the conveyor belts or belt conveyors in the peripheral region in such a manner that they hang in the free space with the curvature facing downwards, said device having a lead component into which a sagging sausage runs, by means of which it is pivoted up in the direction of the conveying plane, and having a second conveying device for receiving the upwardly pivoted sausage.

In the case of the transport device according to the invention, two conveying devices are used between which an automatic aligning device is provided which utilizes the fact that the sausages are curved as a working and functional means for aligning the sausages. The sausages are transported behind one another on a first conveying device in random fashion in respect of the curvature alignment. The first conveying device has two conveyor belts or belt conveyors spaced laterally apart from one another which exhibit corresponding studs, each of which receives a sausage. In other words, each sausage lies in the region of its ends on the two conveyor belts or belt conveyors. During transportation of the sausages prior to the aligning process, the sausages lie substantially horizontally and are supported via a bearing device arranged between the conveyor belts or belt conveyors, if it is assumed that the first conveying device is likewise horizontally positioned.

The sausages then reach the region of a free space in which they only rest on the two spaced-apart conveyor belts or belt conveyors in the region of their sausage ends. These bearing points create pivot points or define a pivot axis about which the sausage can now swing through, as it is no longer supported over its entire length, meaning that it pivots down with its curvature or convexity into the free space. In other words, this swing-through means that the sausage only now rests on the conveyor belts or belt conveyors in the region of its lateral ends; its central region with the curvature hangs downwards into the free space. This now happens with each sausage, irrespective of whether the curvature or the convexity was aligned in the conveying direction or against the conveying direction during the onwards transportation.

The transported sausages which are still supported peripherally on the conveyor belts or belt conveyors then run during onwards transportation individually and behind one another into a lead component; in other words, they run into this lead component with their downwardly hanging curvature or convexity. After they are transported via the conveyor belts or belt conveyors, where they are received in the respective studs, despite running into the lead component in the conveying direction, they are pivoted upwards with their curvature or their convexity more or less opposite the conveying direction, in other words, the curvature or the convexity is pivoted up back into the horizontal plane against the conveying direction. In this position, which all sausages inevitably adopt due to the previous swing-through and running into the lead component, the sausages are then transferred to the second conveying device on which all sausages are then aligned identically in relation to the orientation of their curvature. Either a grouping or a handling device, e.g. a delta grab for direct transfer into corresponding packaging, or similar, can then be attached thereto.

It is evident that with the transport device according to the invention no additional aligning or adjusting device working in any automated or controlled manner is used. Instead, the alignment or adjustment according to the invention is based solely and exclusively on the fact that a particular shape has been predefined for the sausage which leads to corresponding problems in the prior art, in other words that the invention ultimately utilizes the very disadvantage existing in the prior art and uses it as a functional characteristic.

As described, the sausages are transported on the first conveying device lying horizontally, for example. As stated, the sausages are received with their edges in the studs of the two conveyor belts or belt conveyors. In the region of the center of the sausage, so in the region of the convexity, they are likewise supported by a supporting device and may, for example, be received on a corresponding sliding surface which facilitates good sliding of the sausages carried along by the lateral studs. It is advantageous, however, if as an alternative to a sliding surface of this kind a further circulating conveying device is provided upstream of the free space between the conveyor belts or belt conveyors, which further circulating conveying device likewise has studs which are arranged in the extension of the studs of the conveyor belts or belt conveyors and receive the sausage. In other words, the first conveying device ultimately comprises two separate conveyors, namely the two lateral conveyor belts or belt conveyors and also a further conveying device therebetween in the form of a corresponding stud belt or the like, wherein all studs are axially aligned with one another. The sausages therefore lie on this central conveying means or this central conveying device during routine transportation. The conveying means, e.g. the stud belt, ends when the transition to the free space is reached, as at this point the sausages of course no longer require central support, as they are intended to swing through.

A central element for aligning the sausages is the lead component against which the sausages run and via which they are pivoted up again in a defined manner. According to a first alternative of the invention, this lead component may be configured as an inclined surface arranged in the free space, preferably in the form of a ramp-like, slantingly arranged plate, alternatively also as a slantingly arranged strut or rail. The sagging sausages run with their lowest point, in other words the tip of the convexity, against this inclined surface and are forcibly slowed down, while the two ends, as they are lying in the studs, are moved on. This slowdown, coupled with the pitch of the inclined surface, means that the sausages are then pushed along onto this inclined surface and, at the same time, pivoted upwards with their previously sagging curvature against the conveying direction, into the horizontal position in which, on the one hand, the inclined surface ends, so that the sausages are conveyed down again from the inclined surface and, on the other hand, the transfer to the second conveying device then takes place.

The inclined surface, whether in the form of the plate or the strut or rail, is configured as a metal component, for example, preferably made of high-grade steel. However, it may also be a plastic component, for example made of PTFE or another material.

As an alternative to the embodiment of the inclined surface in the form of a positionally-fixed plate or strut or rail, it is also conceivable for the inclined surface to be created via a strand of a circulating conveyor belt arranged in the free space, which conveyor belt circulates at a lower speed than the conveyor belts or belt conveyors, or by means of a roller platen which comprises a plurality of rotatable rollers arranged one after the other in the transport direction, which rollers, insofar as they are actively driven, rotate at a slower speed than the conveyor belts or belt conveyors. The operating principle in this case is the same as described in the alternative described above. However, the inclined surface in this case is not fixed, but created by means of a conveyor belt which has a slantingly running portion or a slantingly running strand against which the individual sausages run. Since the movement speed of the slanting strand is slower than that of the lateral conveyor belts or belt conveyors, there is a slowdown here too and a lifting-up along the inclined surface as far as the horizontal alignment position. The advantage of using a circulating conveyor belt to create the inclined surface is that the conveyor belt can be continuously cleaned, in other words a corresponding cleaning station can be provided below it, through which the conveyor belt permanently runs, so that it is constantly cleaned. This is advantageous when the sausages are actively drawn up along the inclined surface, as stated, meaning that there is a greater load which can lead to a film being created, as this is an organic material. Alternatively, an inclined roller platen can also be provided to create the inclined surface, wherein the rollers are mounted in a suitable frame. They are driven and rotate at a speed which is slower than the transport speed of the conveyor belts or belt conveyors, so that here, too, a braking effect is created which, in conjunction with the inclined position, leads to the upwards pivoting. The rollers may be coupled via a shared belt, for example, so that only one roller has to be actively driven via a motor. Alternatively, the rollers may also not be driven, but only set in rotary motion when a sausage is advancing.

It is advantageous for the pitch of the inclined surface to be capable of being adjusted manually or automatically, for example by the inclined surface, e.g. the plate, being moved into the defined inclined positions which are defined by corresponding locking or suspensions positions on a frame rack or the like, for example. Alternatively, an adjusting cylinder or the like may also be used, in order to be able to change the pitch continuously or automatically. In this way, the distance and duration over which the sausages are in contact with the inclined surface and therefore also the speed of the upward pivoting process can be set, and in addition an adjustment to correspondingly varying sausage lengths with varying curvature radii or sausage calibers and the like is also possible.

As an alternative to the embodiment of the lead component in the form of a positionally fixed inclined surface or a moving inclined surface, it is also conceivable for the lead component to be created via a pin that can be moved up and down preferably vertically, wherein the sagging sausage runs into the raised pin which is moved downwards after the sausage has been pivoted up. The pin therefore forms a kind of abutment against which the sausage runs and is pivoted up due to the braking effect. The pin itself moves up and down at corresponding intervals and is therefore moved into and out of the conveying path. Of course it is only located in the conveying section when a sausage is coming and is to be pivoted upwards; it is lowered again to let the sausage out again and release it for continued transportation. The movement of the pin can be controlled via a corresponding actuator or the like using the corresponding frequency.

Finally, the lead component may also be created in the form of a rotatable roller. The roller may be driven, for example, and rotate at a slower speed than the conveying speed of the conveyor belts or belt conveyors. Each sausage runs against the roller or drum where, on the one hand, it is slowed down and, on the other hand, due to the round cross section of the roller or drum into which the transported sausage runs, it is also pivoted up. Alternatively, the roller may also not be driven, but only set in rotary motion when a sausage is advancing.

As described, the sausages are received in corresponding studs on the conveyor belts or belt conveyors and, where necessary, the conveying device located between these. In order to ensure that two adjacent sausages do not touch one another, so do not rest against one another, which would at times affect the swing-through of the front sausage in the transport direction, as the sausages could stick to one another, it is advantageous for the studs on the conveyor belts or belt conveyors and possibly the conveying means arranged therebetween to be spaced apart from one another in the conveying direction, in such a manner that two adjacent sausages received in the studs do not come into contact. In other words, the studs are spaced far enough apart from one another, viewed in the conveying direction, so that even if the sausages have a significant curvature they do not rest against one another.

An advantageous development of the invention envisages that in the region of the free space deflection devices for tilting the conveyor belts or belt conveyors inwards to the free space about their longitudinal axis are provided. A deflection device of this kind is advantageous when using flat conveyor belts or belt conveyors. If conveyor belts or belt conveyors with a round cross section are used, a deflection device of this kind can be dispensed with. The flat conveyor belts or belt conveyors are therefore tilted slightly inwards on both sides via these deflection devices, so that as a consequence of this the bearing points on which the sausages lie on the two conveyor belts or belt conveyors pivot inwards. This is advantageous for the swing-through action, as it means that a kind of forced control of the conveyor belts or belt conveyors is ensured, in other words a positional change which can be actively transferred to the respective sausage ends, which is necessary for the swing-through movement.

The deflection devices may advantageously be created in the form of two rails which guide the conveyor belts or belt conveyors in the conveying direction and have a guide surface shape which causes tilting. The conveyor belts or belt conveyors therefore run in the region of the free space into the two deflection devices or the guide surfaces thereof and, as a result of the inwardly tilted guide surface shape, they are forcibly tilted inwards.

The tilting angle should be between 15-60°, in particular between 25-45°, and preferably around 30°. Following the tilting, when the conveyor belts or belt conveyors run away from the deflection devices again, they are forcibly aligned in parallel once more.

In order to make sure that the swing-through action, but also the upwards pivoting, is even more reliable, it is conceivable for vibrational means to be provided to generate vibrations at the deflection devices at least in the region of the guide of the conveyor belts or belt conveyors. These vibrational means make it possible for the deflection devices to be vibrated at higher frequencies, which results in the conveyor belts or belt conveyors guided on the deflection devices vibrating accordingly. This means that the sausages resting against them or lying in the studs likewise experience vibrations in this region. These vibrations mean that the sausages can also become forcibly detached from their bearing position on the stud walls, where applicable, so that they do not lie snugly against them. This is also particularly advantageous for upwards pivoting, since the sausages cannot remain suspended on the stud walls.

An advantageous development of the invention envisages that the conveyor belts or belt conveyors are manually or automatically adjustable relative to one another in terms of their spacing. In other words, the conveyor belts or belt conveyors can either be positioned more closely or further apart from one another, depending on the requirements. This allows the device to be adapted in respect of sausages of correspondingly different lengths. This lateral adjustment of the two conveyor belts or belt conveyors may take place manually, for example via corresponding threaded spindle drives which can be screwed together or unscrewed from one another and to which the corresponding guides of the conveyor belts or belt conveyors are coupled. An automatic adjustment via corresponding adjusting cylinders is also conceivable, wherein in this case the sausage length can be automatically detected by means of a detection device, after which the conveyor belts or belt conveyors can be aligned, so consequently the width can be automatically converted accordingly.

Furthermore, it is conceivable for the conveyor belts or belt conveyors and, if necessary, the conveying means arranged therebetween to be arranged detachably and exchangeably on the moving device moving them. The conveyor belts or belt conveyors naturally run over corresponding drive rollers or deflection rollers. It is possible to remove them and replace them with other conveyor belts or belt conveyors or conveying means which have a smaller or larger stud width. This allows an adjustment to different sausage calibers. It is conceivable, for example, for a first pair of conveyor or transmission belts to be designed for a first caliber range, e.g. for calibers of 10-18 mm (the caliber indicates the diameter of the sausage in mm). A second pair of conveyor or transmission belts that can be fitted as a replacement is designed with studs for a caliber range of caliber 18-25 mm and a third pair of conveyor or transmission belts for a third caliber range of 25-40 mm, or similar. This allows a simple and flexible adjustment of the device in respect of the caliber of the sausages being conveyed, so that the device can also be used for different calibers, in particular also in conjunction with the adjustment of the spacing of the conveyor belts or belt conveyors. To the extent that the central conveying means also exhibits studs, this can also be exchanged.

Furthermore, the first conveying device may be assigned an aligning device for the lateral alignment of the sausages received in the studs. By means of this aligning device, it is ensured that all sausages are aligned at one end in respect of a common plane or line. Since the mainly machine-produced sausages are in any event virtually the same length, it is therefore possible to ensure that the sausages arranged behind one another are all identically positioned and in relation to the swinging and upward pivoting action also lie in the same regions at the end on the conveyor belts or belt conveyors. An aligning device of this kind may, for example, be a positionally fixed rotating wheel which is either round and runs with its circumferential surface against the sausage ends or exhibits aligning portions which make contact with the ends of the individual sausages, in other words gearwheel-like projections. Corresponding synchronization in relation to the studs is required in this case.

As described, the newly upwardly pivoted but then aligned sausages are transferred to a second conveying device where either a grouping or directly a corresponding handling of the aligned sausages takes place. This second conveying device preferably comprises a plurality of conveyor belts or belt conveyors arranged in parallel, wherein the conveyor belts or belt conveyors of the first conveying device run between two conveying belts or belt conveyors of the second conveying device. This means that the conveying devices more or less engage with one another, so that a very simple transfer is possible, as a seamless transition can be achieved in the same transport plane.

It is further advantageous for the second conveying device to be assigned a grouping device for creating a group of sausages, as a result of which a defined group made up of a defined number of sausages is formed in the region of the second conveying device. A sausage group of this kind may comprise 5 or 10 sausages, for example, depending on how the corresponding batch is to be configured and how the downstream handling system is set up. A grouping setting of this kind may, for example, comprise at least one braking or stopping element for braking or stopping a sausage to create a group of sausages, which braking or stopping element can be introduced into the movement path of the sausages. A braking or stopping element of this kind, for example a vertically movable pin which can be moved via an adjusting cylinder or the like, is used almost as a lead element against which the first sausage runs. The next sausage then runs into this first sausage and the next one in turn runs into this one, etc. until the corresponding group of sausages has been formed, after which the braking or stopping element is removed from the movement path once again, in order to transport the sausage group that has been created onwards to the handling station. Two laterally spaced pins are preferably provided, so that a kind of abutment line or abutment plane is formed and slippage about a vertical axis is precluded.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 9 shows a schematic representation of a further device according to the invention with a third embodiment of a lead component for pivoting up the sausages that have swung through.

DETAILED DESCRIPTION OF THE INVENTION

Figure 1:
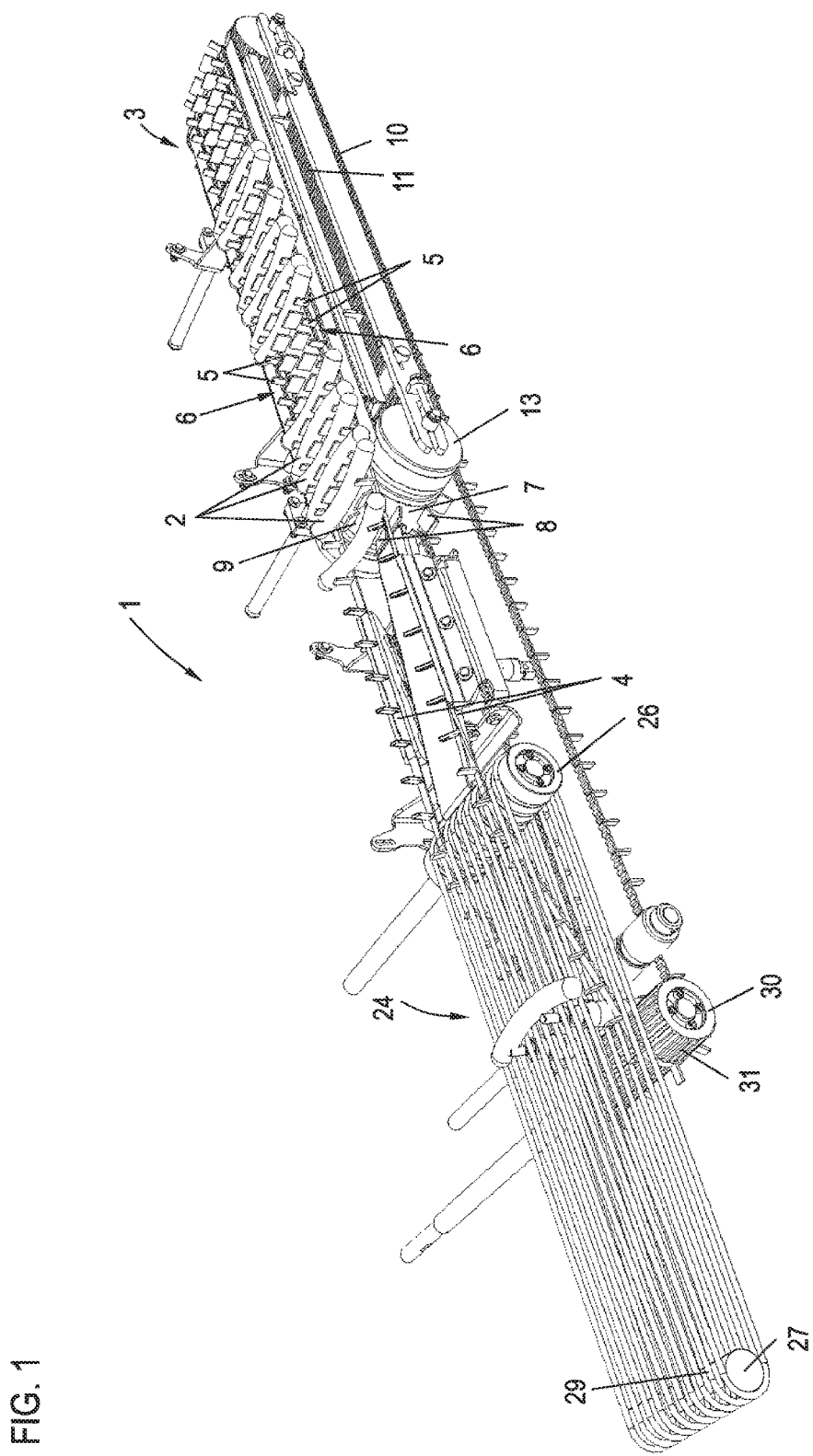
FIG. 1 shows a perspective view of a transport device according to the invention.

FIG. 1 shows a device 1 according to the invention for transporting elongate sausages 2 exhibiting a curvature. The device 1 comprises a first conveying device 3 comprising two circulating conveyor belts or belt conveyors 4 spaced apart from one another laterally, each have projecting carriers 5 on the outside, wherein a stud 6 is formed between each of the carriers 5. A sausage 2 is received in each of these studs 6 and supported by its end portions on the respective conveyor belt or belt conveyor 4.

Between the two conveyor belts or belt conveyors 4 is provided a further circulating conveying means 7, likewise a conveyor belt in the example shown, on which corresponding studs 9 are formed likewise via carriers 8, which studs are positioned in the extension of the studs 6. This means that a sausage 2 is received with its end portions in each case in the region of the studs 6 and with its central region in a stud 9.

As is apparent, the sausages 2 lie on the first conveying device 3 in more or less random fashion in the horizontal position, in other words there is no defined alignment of the curved sausages in relation to the position of the curvature. As FIG. 1 clearly shows, the curvatures or convexities of two adjacent sausages either face away from one another or lie alongside one another; the alignment is completely arbitrary. As described below, it is possible using the transport device according to the invention for all sausages to be brought into a common, defined alignment.

The conveyor belts 4 and also the conveying means 7, in other words likewise this conveyor belt, each have toothing 10, 11 on their inner side with which they engage with outer toothing 12 (see FIG. 2) on a driven roller.

At the other end of the conveying device 3 a deflection roller 13 is provided on which, however, only the conveying means 7, in other words the central conveyor belt, is deflected while the two conveyor belts 4 spaced laterally from one another run on, they are only guided via the deflection roller 13.

In order to adjust the respective conveyor belt or transmission belt tension, whether in relation to the conveyor belts or belt conveyors 4, whether in relation to the central conveying means 7, corresponding adjusting means 14 are provided on the drive roller 12 or the deflection roller 13, for example, via which the respective roller can be displaced longitudinally and the tension can therefore be varied.

Figure 2:
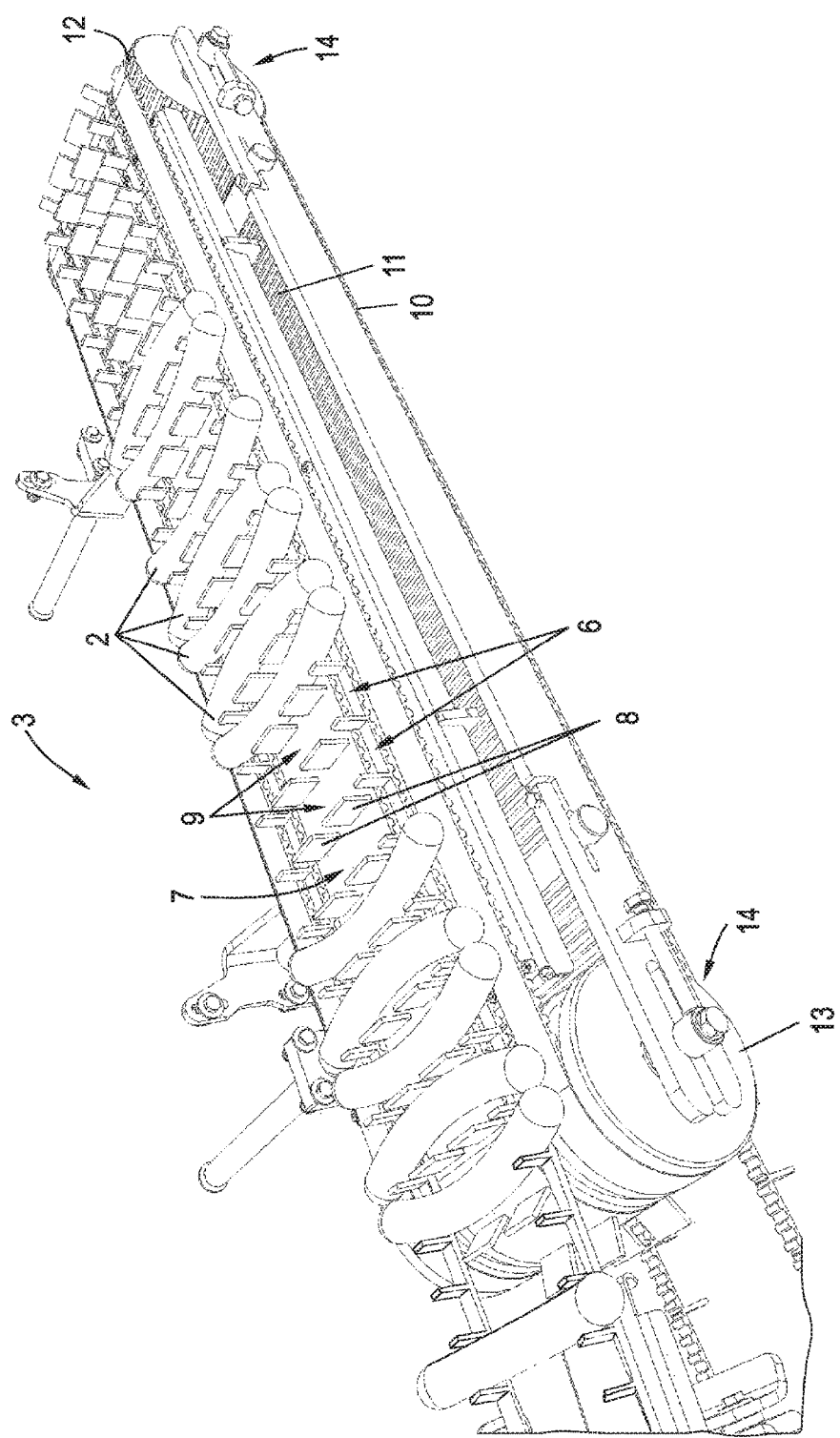
FIG. 2 shows a partial view of the device from FIG. 1 depicting the first conveying device.
Figure 3:
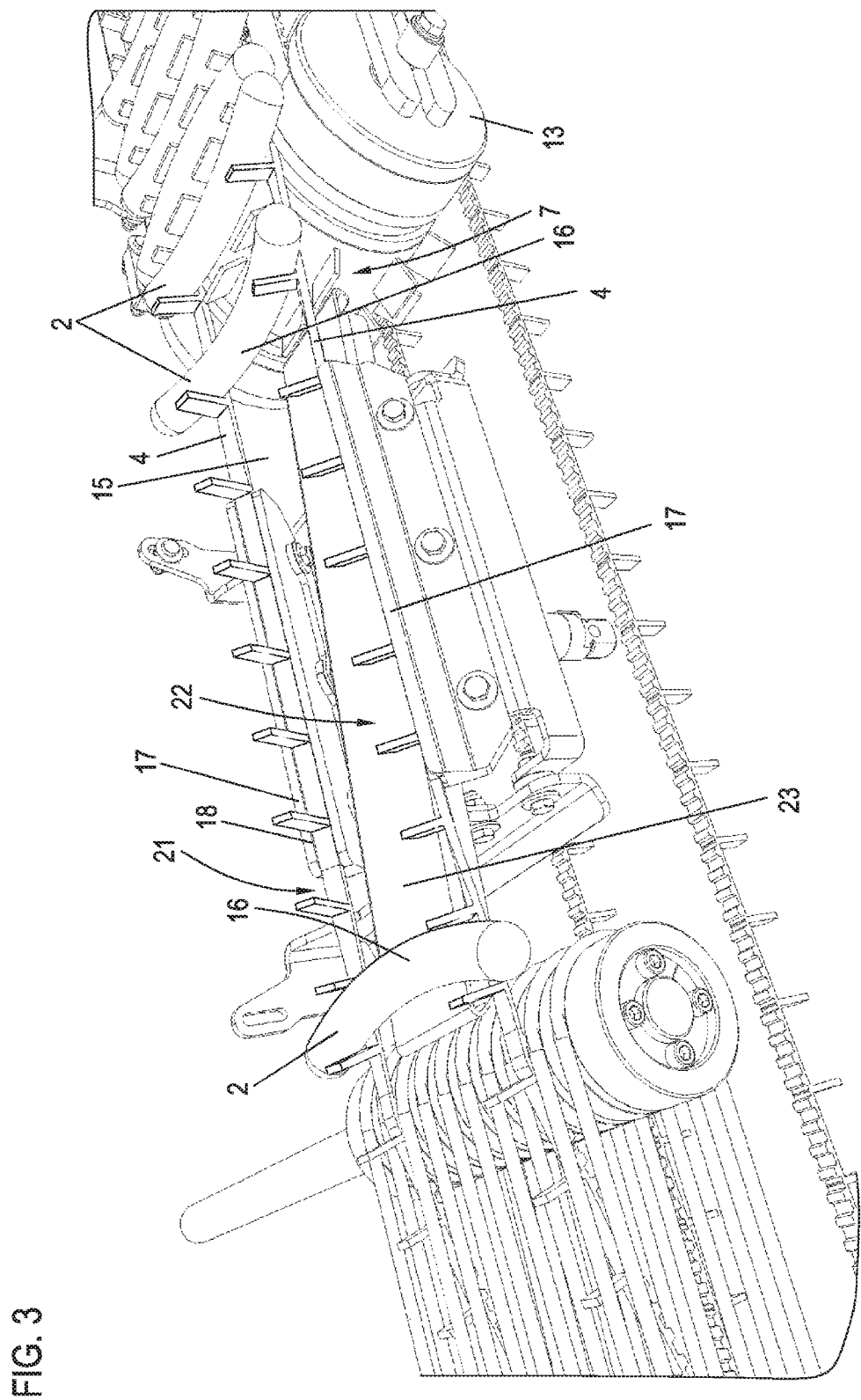
FIG. 3 shows a partial view of the device from FIG. 1 depicting the alignment unit.
Figure 4:
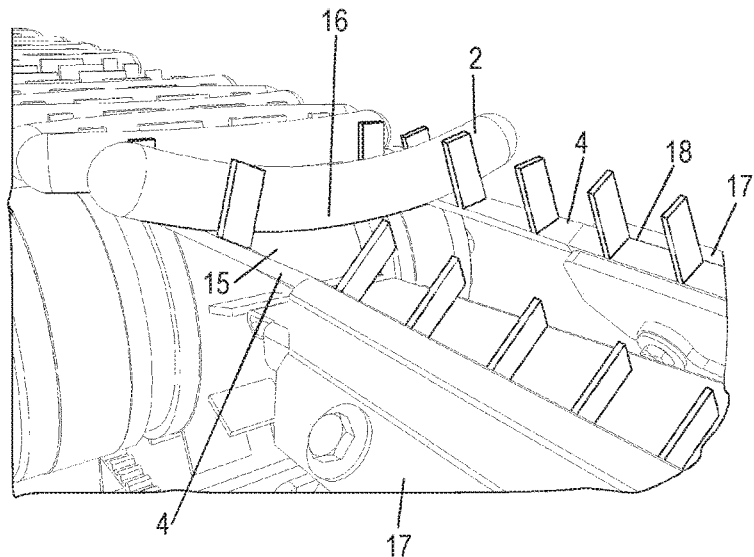
FIG. 4 shows a perspective view of part of the aligning unit with a sausage swinging through, FIG. 5 shows a perspective view of the aligning unit with an aligned, upwardly pivoted sausage

As shown in FIGS. 2 and 3, the two conveyor belts or belt conveyors 4 run beyond the deflection roller 13, so that, because the conveying means 7 located between them is deflected, a free space 15 inevitably forms between the conveyor belts or belt conveyors 4 in which the sausages 2 are no longer supported centrally in the region of their curvature or convexity. They are only supported in the region of their ends on the conveyor belts or belt conveyors 4. This means, see FIGS. 3 and 4 in particular, that a sausage which is only supported at the ends can swing through, in other words, that it hangs with its curvature or with its convexity 16 facing downwards in the free space 15. In order to further support this swing-through and more or less also promote active movement of the sausage in this sagging position, the two conveyor belts or belt conveyors 4 run via deflecting devices 17 which are configured in the form of elongate guide rails and have a corresponding guide groove 18 in which each conveyor belt or belt conveyor 4 runs. The deflecting devices 17 are configured and positioned in such a manner that each conveyor belt 4 or belt conveyor experiences a slight torsion about its longitudinal axis, as is clearly shown in FIG. 4 in particular. This means that the conveyor belts or belt conveyors 4 are tilted inwards, which supports the swing-through of the respective sausage and a pulse is more or less transmitted to the respective sausage by the twisting or torsional movement of the conveyor belt or belt conveyor 4, which pulse supports this swinging movement, insofar as the sausage has not yet swung through. If the conveyor belts or belt conveyors 4 run back down from the respective deflection device 17, they return to their untwisted starting position, as clearly shown in FIG. 3.

Figure 7:
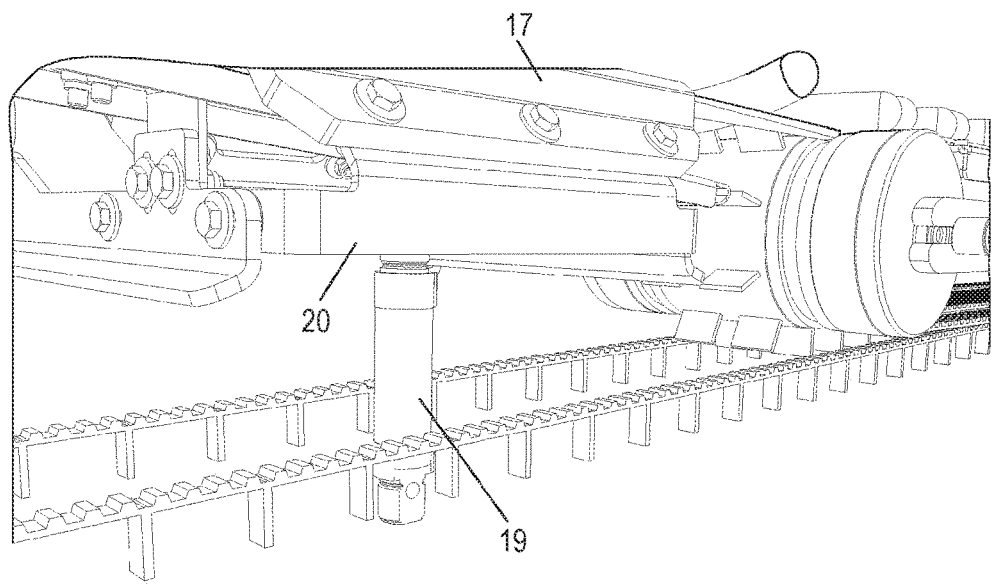
FIG. 7 shows a perspective view in the region of the aligning unit depicting an optional vibration device.

To further support the swing-through movement, it is conceivable for the deflecting devices 17 to be coupled to a vibrational means 19, as is optionally depicted in FIG. 7. The deflection devices 17 are arranged on a common carrier frame 20, to which in turn a vibrational means 19, for example a cylinder working with sufficient frequency or a piezo oscillator or the like, is assigned, which results in the entire frame 20 and with it the two deflection devices 17 vibrating at a corresponding frequency. This results in each sausage running into the deflection devices 17 being actively vibrated in addition in the region of its bearing means, consequently therefore a slight detachment from the longitudinal bearing means in each case is constantly achieved. It is thereby possible to ensure that each sausage swings through, even if it had previously still been bearing against the adjacent carrier 5 in each case and, where appropriate, has not yet swung through completely. A vibration means of this kind is only optional, however, and not compulsory.

Each swung-through sausage 2 is still received in the respective stud 6 of the two adjacent conveyor belts or belt conveyors 4. In this way, they are carried along and transported along the free space 15. An aligning device 21 which is used for the uniform alignment of the swung-through sausages 2, is assigned to the free space 15. In the exemplary embodiment shown, this aligning device 21 comprises an inclined surface 22 which is formed by a metal sheet 23, preferably a high-grade steel sheet, which, where necessary, can have its pitch changed. It has a slanting position relative to the transport plane of the swung-through sausages 2, in other words it runs from below through the free space 15 upwards into the region of the transport plane.

Each swung-through sausage inevitably hangs with its convexity 16 lower than the conveying plane, which means that during transportation along the free space 15 it inevitably runs with its convexity 15 into the inclined surface 22. In this way, the sausage is, on the one hand, slowed down and, on the other hand, it is naturally pivoted up during continued transportation, in other words the convexity 15 is pivoted more or less backwards against the direction of travel. At the end of the inclined surface 23, see FIG. 3, the sausage 2 resting against it is pivoted back into the horizontal plane, but its convexity 16 is now at the back relative to the transport direction. Since all sausages 2 are transported along this inclined surface 22, all sausages 2 are forcibly aligned uniformly in just this manner.

Rather than a high-grade steel plate, the plate 23 may also be made of plastic, for example PTFE. Instead of a plate 23, a strut or the like may also be provided. The only thing that is important is for the aligning element in each case to run slantingly in the free space 15 coming from below, so that the sagging convexity in each case is forcibly guided against it and is pivoted upwards during onwards transportation.

Figure 5:
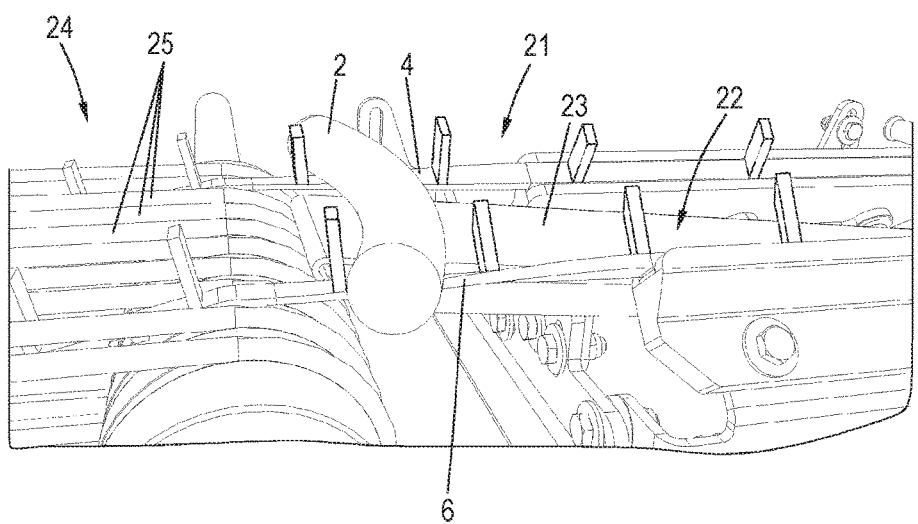

An enlarged view of the aligned, upwardly pivoted sausage 2 is shown in FIG. 5. It is apparent that the sausage lies on the inclined surface 22 or else the plate 23, but its convexity faces backwards against the direction of travel. It is more or less horizontally aligned, since the inclined surface 22 runs with its front end close to or into the transport plane. However, it is still located in a stud 6 in each case and is thereby carried along.

Figure 6:
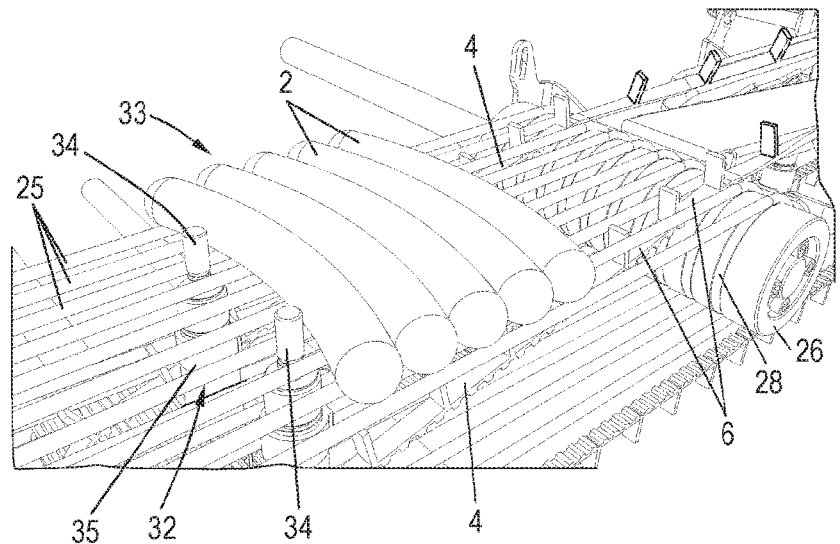
FIG. 6 shows a partial view of the device from FIG. 1 depicting the second conveying device with the assigned grouping device

As shown in FIG. 5, the region of the aligning device 21 is seamless adjoined by a second conveying device 24 which is made up of a plurality of conveyor belts or transmission belts or cords 25 arranged spaced apart from one another. They run about a deflecting roller 26 via which the two conveyor belts or belt conveyors 4 also run on the top side. At the other end, the conveyor belts, transmission belts or cords 25 run over a second driven conveying roller 27. The conveyor belts, transmission belts or cords 25 which, as shown in FIG. 6, have a round cross section in the example shown, run in corresponding grooves 28, 29 on the corresponding deflection rollers 26, 27. As an alternative, it would also be possible here for corresponding toothed conveyor belts or transmission belts to be used which engage with external toothing on at least one of the deflection rollers 26, 27, preferably of course on the driven deflection roller 27. The conveyor belts, transmission belts or cords 25 have no carriers and therefore studs, as there is no forced conveyance against a resistance on the second conveying device 24, as in the region of the upstream aligning device 21.

As shown in FIGS. 5 and 6, the two conveyor belts 4 dip after they have been guided over the first deflection roller 26 and are guided to a deflection roller 30 which lies below the second conveying device 24 and which likewise has external toothing 31 in the example shown. From there, the conveyor belts 4 are guided back again. In order to facilitate this, the conveyor belts or belt conveyors 4 run between two conveying belts, transmission belts or cords 25 which, as stated, are spaced apart from one another laterally. The individual sausages 2 are therefore released and lifted out of the studs 6, as they rest on the conveyor belts, belt conveyors or conveyor cords 25. This means that a simple transfer from the conveyor belts or belt conveyors 4 to the second conveying device 24 with conveying belts, transmission belts or cords 25 is possible.

The second conveying device 24 is assigned a grouping device 32 which enables groups of sausages 33 comprising a defined number of sausages to be created. In the example shown, this grouping device 32 comprises two pins 34 that can be moved up and down vertically between two conveyor belts, belt conveyors or conveyor cords 25, which pins can be moved vertically via corresponding adjusting cylinders 35. They can therefore be moved into and out of the movement path of the sausages 2. If they are moved upwards, the first sausage 2 which is being transported on the conveyor belts, transmission belts or cords 25 runs into the two pins 34 and is stopped. The conveyor belts, belt conveyors or conveyor cords 25 which have good sliding properties in relation to the sausage continue to run under the sausage 2. Immediately thereafter, a second sausage 2 runs into the first sausage resting against the pins 34, followed by the next sausage, etc., until a predefined number of sausages is reached which can be detected by a corresponding detection device which is no longer shown here, for example a camera or a corresponding sensor or the like. As soon as the corresponding number of sausages which defines the group of sausages 33 has been accumulated, the pins 34 are moved downwards again and the group of sausages 33 is therefore released and, since the sausages are no longer slowed down, they are transported straight on as a group via the conveyor belts, belt conveyors or conveyor cords 25. As soon as the last sausage 2 in the group of sausages 33 has run via the grouping device 32, the pins 34 are lifted again, so that the next sausage runs into them and the next group of sausages 33 can be created.

Figure 8:
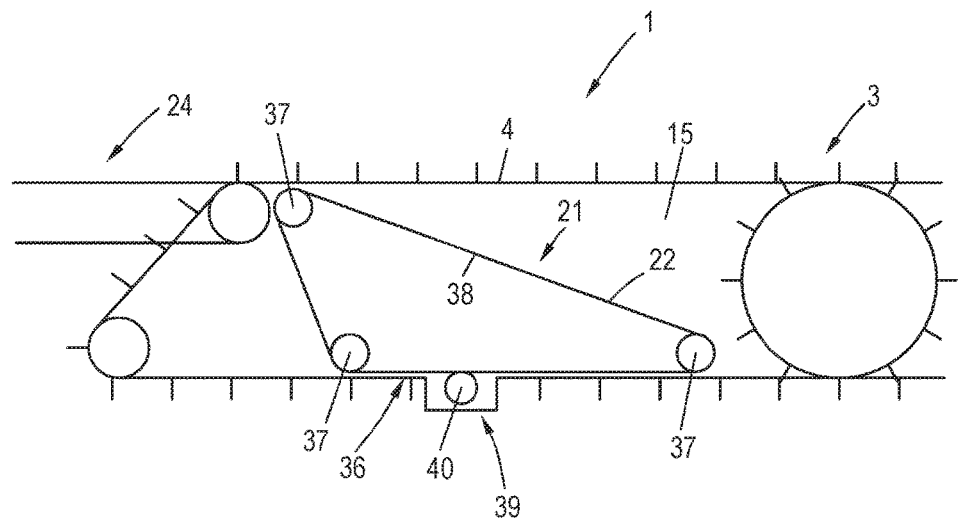
FIG. 8 shows a schematic representation of a device according to the invention of a second embodiment with an inclined surface formed via a circulating conveyor belt.

An alternative embodiment of a device 1 according to the invention is shown by the schematic representation according to FIG. 8. Here, too, a first conveying device 3, a second conveying device 24, and a free space 15 therebetween and an aligning device 21 arranged therein are provided. The aligning device 21 in this case is different to that in the exemplary embodiment according to the preceding figures. Although an inclined surface 22 is likewise provided there, this is formed by means of a circulating conveyor belt 36 which is guided via corresponding deflection rollers 37. The uppermost deflection roller 37 is located in the region of the conveying plane of the sausage 2, the deflection roller 37 shown on the right substantially thereunder, so that a correspondingly slantingly running strand 38 results which forms the inclined surface 22.

One of the rollers 37 is driven, so that the conveyor belt 36 circulates. However, its movement speed is slower than the conveying speed of the two conveyor belts or belt conveyors 4, so that a sausage running into the strand 38 is forcibly slowed down.

By way of example, a cleaning device 39 is provided in this case by means of which continuous cleaning of the outside of the conveyor belt 36 is possible, for example via a rotating brush 40 or similar.

Irrespective of how completely the device according to the invention is configured, the lateral conveyor belts or belt conveyors 4 are detachable from the respective movement device, in other words the corresponding deflection or conveying rollers, which means they can be removed and replaced with others. This also applies to the conveying means 7 located between them, in other words, the additional conveyor belt. This makes it possible for other conveyor belts or belt conveyors 4, 7 to be fitted accordingly which have greater or smaller studs, for example, so that sausages of different calibers can also be processed. For example, a first set of conveyor belts or belt conveyors 4, 7 with studs which are designed for a caliber 1-3 is provided. A second set of conveyor belts or belt conveyors 4, 7 is designed for a caliber 4-6, etc. In this way, the transport device for processing different sausage calibers can therefore easily be retooled. A conversion of the aligning device may be necessary insofar as the inclined surface 22 is slightly raised where necessary at its lower end, so that an earlier accumulation of smaller sausages which only have a smaller convexity is made possible.

It is also possible, in order to adapt the device 1 to sausages of different lengths, for the space between the two lateral conveyor belts or belt conveyors 4 to be changed. This may take place, for example, in that they are placed in corresponding guide grooves which are further apart from one another on the corresponding deflection or conveying rollers. This enables sausages of different lengths to be processed, but each to be supported in their end regions, so that a safe, gravity-controlled swing-through of the sausages in the free space is facilitated.

Figure 9:
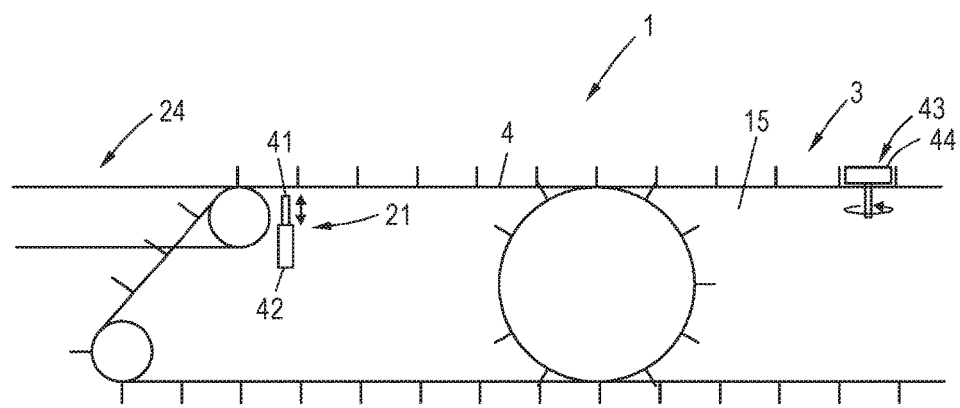

Finally, FIG. 9 shows a third embodiment of a device 1 according to the invention, in turn comprising a first conveying device 3, a second conveying device 24 and an aligning device 21 arranged therebetween, which aligning device is in turn arranged in the free space 15. This comprises, for example, a pin 41 which is vertically movable slantingly and which (see the double arrow) can be moved vertically via an adjusting cylinder 42 or the like with a corresponding high frequency and is thereby moved in the movement path of an inwardly transported, sagging sausage 2. Each sausage runs into the pin, is briefly slowed down and pivoted upwards, after which it is passed straight to the second conveying device 24, since in this case the aligning device 21 is arranged right before the transition of the conveyor belts or belt conveyors 4 to the second conveying device 24. In this case, a corresponding sensory or camera-based detection device is advantageously provided, via which each individual sausage 2 is detected, so that the pin 21 can be controlled in a correspondingly synchronized manner.

Likewise shown here is an optional aligning device 43 comprising in the example shown a positionally fixed rotating wheel 4 with which the individual sausages which are received in the studs 6, 9 can be aligned laterally. The wheel 44 grips the ends of the sausages laterally, so that the respective end of all sausages passing by it can be exactly aligned, so that all sausages which are more or less the same length are uniformly aligned laterally. The aligning device 34 is naturally located in the region of the first conveying device 3.

While specific embodiments of the invention have been shown and described in detail to illustrate the inventive principles, it will be understood that the invention may be embodied otherwise without departing from such principles.

We claim:

1. A device for the transportation of elongate sausages exhibiting a curvature, said device having a first conveying device comprising two circulating conveyor belts or belt conveyors spaced apart from one another laterally, each having studs for randomly receiving the sausages, wherein an end portion of a sausage can be received in two adjacent studs in each case, wherein a free space is provided beneath the conveying belts or belt conveyors at least sectionally along the conveying path, in order to facilitate a swing-through of the sausages mounted on the conveyor belts or belt conveyors in the peripheral region in such a manner that they hang in the free space with the curvature facing downwards, said device having a lead component into which a sagging sausage runs, the lead component pivoting the sagging sausage up in the direction of the conveying plane, and having a second conveying device for receiving the upwardly pivoted sausage.

2. The device according to claim 1, wherein a further circulating conveying device is provided upstream of the free space between the conveyor belts or belt conveyors, which further circulating conveying device likewise has studs which are arranged in the extension of the studs of the conveyor belts or belt conveyors and receive the sausage.

3. The device according to claim 1, wherein the lead component is configured as an inclined surface arranged in the free space.

4. The device according to claim 3, wherein the inclined surface is in the form of a ramp-like, slantingly arranged plate or as a slantingly arranged strut or rail.

5. The device according to claim 3, wherein the inclined surface is created via a strand of a circulating conveyor belt arranged in the free space, which conveyor belt circulates at a lower speed than the conveyor belts or belt conveyors, or by a plurality of rotatable rollers arranged one after the other in the transport direction.

6. The device according to claim 3, wherein the pitch of the inclined surface is capable of being adjusted manually or automatically.

7. The device according to claim 1, wherein the lead component is a pin that can be moved up and down preferably vertically, wherein the sagging sausage runs into the raised pin which is moved downwards after the sausage has been pivoted up.

8. The device according to claim 1, wherein the lead component is a rotatable roller.

9. The device according to claim 1, wherein the studs on the conveyor belts or belt conveyors and possibly the conveying means are spaced apart from one another in the conveying direction, in such a manner that two adjacent sausages received in the studs do not come into contact.

10. The device according to claim 1, wherein in the region of the free space deflection devices for tilting the conveyor belts or belt conveyors inwards to the free space about their longitudinal axis are provided.

11. The device according to claim 10, wherein the deflection devices are created in the form of two rails which guide the conveyor belts or belt conveyors in the conveying direction and have a guide surface shape which causes tilting.

12. The device according to claim 10, wherein the tilting takes place about an angle between 15-60°, in particular between 25-45° and preferably around 30°.

13. The device according to claim 10, wherein vibrational means for generating vibrations at the deflection devices are provided at least in the region of the guide of the conveyor belts or belt conveyors.

14. The device according to claim 1, wherein the conveyor belts or belt conveyors are manually or automatically adjustable relative to one another in terms of their spacing.

15. The device according to claim 1, wherein the conveyor belts or belt conveyors are arranged detachably and exchangeably on the moving device moving them.

16. The device according to claim 1, wherein the first conveying device is assigned an aligning device for the lateral alignment of the sausages received in the studs.

17. The device according to claim 16, wherein the aligning device has a positionally fixed rotating wheel, possibly with aligning portions which make contact with the ends of the individual sausages.

18. The device according to claim 1, wherein the second conveying device is formed by means of a plurality of conveyor belts, belt conveyors or conveyor cords arranged in parallel, wherein the conveyor belts or belt conveyors of the first conveying device run between two conveyor belts, belt conveyors or conveyor cords of the second conveying device.

19. The device according to claim 1, wherein the second conveying device is assigned a grouping device for creating a group of sausages.

20. The device according to claim 19, wherein the grouping device comprises at least one braking or stopping element for braking or stopping a sausage to create a group of sausages, which braking or stopping element can be introduced reversibly into the movement path of the sausages.

21. The device according to claim 20, wherein the braking or stopping element is a movable pin into which a first sausage runs, on which one or a plurality of other sausages then accumulate to form the group of sausages.

* * * * *